United States Patent Office 3,187,047
Patented June 1, 1965

3,187,047
REDUCTIVE AMINATION OF KETONES
Milton Green, Newton Highlands, Mass., assignor to Polaroid Corporation, Cambridge, Mass., a corporation of Delaware
No Drawing. Filed Aug. 7, 1961, Ser. No. 129,566
5 Claims. (Cl. 260—570.8)

This invention relates to a novel chemical synthesis, and more particularly to an improved process for preparing amines by reductive amination of ketones or of mixtures containing ketones.

In copending U.S. application Serial No. 79,158, filed December 29, 1960, there is disclosed a process for preparing amines from nitroolefins in what may be regarded as a two-stage process. In the initial stage, a nitroolefin is subjected to the action of molecular hydrogen in the presence of a Raney nickel catalyst and an organic acid such as acetic acid to form a mixture comprising the ketone and the amine corresponding to said nitroolefin. During the formation of the ketone in the initial stage, ammonia is split off and is immediately taken up by or reacts with the organic acid to form the ammonium salt thereof. In the second stage of the reaction, substantially all of the ketone in the mixture is converted into the corresponding amine by the further action of hydrogen in the presence of the ammonium salt.

The present invention is directed to another means for preparing amines in satisfactory yield from ketones or from mixtures containing ketones.

It is therefore one object of this invention to provide a novel process for producing amines in satisfactory yield.

Another object is to provide a simple and efficient process for preparing amines by reductive amination of ketones or of mixtures containing ketones.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

As was indicated previously, the present invention is directed to a simple and efficient process for preparing amines by reductive amination of ketones. It is known to prepare amines by hydrogenation of ketones in the presence of excess ammonia gas. However, so far as is known, it has never been suggested that amines can be prepared efficiently by catalytic hydrogenation of a ketone in the presence of an ammonium salt of an organic acid. It has been discovered by the applicant that if the catalytic hydrogenation of the ketone takes place in the presence of an ammonium salt of an organic acid, a surprisingly high yield of amine is obtained in a simple and efficient process.

Ketones which may be utilized in the practice of this invention may be illustrated by the following formula:

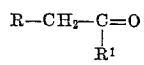

wherein R may be hydrogen, alkyl, and preferably lower alkyl, or aryl and $R^1$ is a lower alkyl radical, such as methyl, ethyl, isopropyl etc. It will be understood that the corresponding ketones in which the alkyl or aryl radical is substituted also may be employed in the present invention, since obviously various substituents may be present in such alkyl and aryl radicals without affecting the reaction mechanism.

The general reaction by which amines are formed by the reductive amination of ketones may be illustrated as follows:

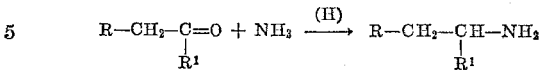

In the preferred embodiments, R is phenyl, or a substituted phenyl radical, such as tolyl; a dialkoxyphenyl, such as 1,4-dimethoxy phenyl; or halo, lower alkyl or lower alkoxy derivatives of such radicals. As examples of ketones within the above formula, mention may be made of ethyl benzyl ketone, methyl para-isopropylbenzyl ketone, methyl meta-tolyl ketone, methyl butyl ketone, methyl phenylisopropyl ketone, methyl benzyl ketone and methyl para-dimethoxybenzyl ketone.

The ammonium salt employed may be the salt of any of the organic acids well known in the art and the particular organic acid employed is not critical. Examples of ammonium salts which may be employed are the ammonium salts of acetic, propionic, butyric, valeric, lactic, tartaric and formic acids.

As was indicated previously, the process of this invention contemplates a catalytic hydrogenation of a ketone in the presence of the ammonium salt of an organic acid. The catalyst employed is preferably a Raney nickel catalyst. However, it is within the scope of the invention to employ other suitable catalysts of equivalent function. As examples of other catalysts which may be employed, mention may be made of palladium on barium sulfate and "Girdler G–49A" nickel catalyst (a stabilized catalyst with a molecular film of oxygen).

The ketone, the hydrogenation catalysts and the ammonium salt are present in an aqueous solution which may also contain a suitable organic solvent or solvents inert to the reactants and the products formed by the reaction. As examples of useful organic solvents, mention may be made of alcohols such as methanol, ethanol and propanol; ethers such as ethyl ether, propyl ether and ethyl hexyl ether; esters such as methyl acetate, ethyl formate and amyl acetate, and various acids and hydrocarbon solvents well known in the art.

The temperatures and pressures at which the novel synthesis of this invention may be carried out are not critical and may vary over a wide range. In general, temperatures and pressures heretofore used in hydrogenation processes may be employed in the process of this invention. For example, temperatures on the order of 40 to 100° C. and pressures on the order of 500 to 2,000 pounds per square inch have been found to give good results. The reaction time will vary, as will be appreciated by those skilled in the art, and is at least in part dependent upon the starting materials utilized and is at least in part dependent upon the temperature and pressure at which the reaction is carried out. Generally, the reaction may be considered as complete when no further measurable amount of hydrogen is taken up and/or no noticeable amount of ketone remains in the reaction mixture.

The following example shows by way of illustration and not by way of limitation the process of this invention, the invention not being limited to the ingredients, proportions, time of treatment and other operating conditions recited therein.

*Example 1*

An autoclave was charged with the following materials:

| | | |
|---|---|---|
| p-Dimethoxyphenyl acetone | kg | 3 |
| Ammonium acetate | kg | 1.2 |
| Acetic acid | ml | 180.0 |
| Methanol | l | 9.5 |
| Water | ml | 300.0 |
| Raney nickel catalyst | g | 500.0 |

The autoclave was closed, heated to 90° C., and hydrogen was then introduced at a pressure of 1,200 pounds per square inch. There was no rise in temperature. No measurable hydrogen was taken up after two hours, although the reaction was permitted to continue overnight. At the end of this time, no noticeable amount of ketone remained. Analysis showed a 95% yield of β-(2',5'-dimethoxyphenyl)-α-methyl-ethylamine, 3% distillation residues and 2% acid insolubles.

It is to be expressly understood that the invention is not limited to the treatment of substantially pure ketones. The ketone which is to be converted into the corresponding amine may be present in mixtures, such as a mixture of ketone and amine prepared in accordance with the processes described in United States Patents Nos. 2,636,901 and 2,647,930 or in mixtures containing other ingredients, in which case the resulting amine may be separated in accordance with conventional technique.

Since certain changes may be made in the above process without departing from the scope of the invention herein involved, it is intended that all matter contained in the above description shall be interpreted as illustrative and not in a limiting sense.

What is claimed is:
1. A process for preparing amines by reductive amination of ketones which comprises: (1) forming a mixture comprising a hydrogenation catalyst and a solution containing an ammonium salt of an unsubstituted aliphatic monocarboxylic acid and a ketone of the formula:

$$R-CH_2-C=O$$
$$\phantom{R-CH_2-}|$$
$$\phantom{R-CH_2-}R^1$$

and (2) introducing molecular hydrogen into said solution to effect reductive amination of said ketone to form an amine of the formula:

$$R-CH_2-CH-NH_2$$
$$\phantom{R-CH_2-}|$$
$$\phantom{R-CH_2-}R^1$$

wherein R of said formulae is a member of the group consisting of hydrogen and alkyl, phenyl, alkyl-phenyl and alkoxy-phenyl radicals and $R^1$ is a lower alkyl radical.

2. The process as defined in claim 1 wherein said acid is selected from the group consisting of acetic, propionic, butyric, valeric, lactic, tartaric and formic acids.

3. The process as defined in claim 1 wherein said catalyst is a Raney nickel catalyst.

4. A process for preparing amines by reductive amination of ketones which comprises: (1) forming an aqueous mixture comprising a Raney nickel catalyst; an ammonium salt of an organic acid selected from the group consisting of acetic, propionic, butyric, valeric, lactic, tartaric and formic acids; and a ketone of the formula:

$$R-CH_2-C=O$$
$$\phantom{R-CH_2-}|$$
$$\phantom{R-CH_2-}R^1$$

and (2) introducing molecular hydrogen into said solution under superatmospheric pressure and at an elevated temperature, thereby effecting reductive amination of said amine to form a ketone of the formula:

$$R-CH_2-CH-NH_2$$
$$\phantom{R-CH_2-}|$$
$$\phantom{R-CH_2-}R^1$$

wherein R of said formulae is a member of the group consisting of hydrogen and alkyl, phenyl, alkyl-phenyl and alkoxy-phenyl radicals and $R^1$ is a lower alkyl radical.

5. The process which comprises forming an aqueous mixture comprising p-dimethoxyphenyl acetone, ammonium acetate and a Raney nickel catalyst, and introducing molecular hydrogen into said solution under superatmospheric pressure and at an elevated temperature to form β-(2',5'-dimethoxyphenyl)-α-methyl-ethylamine.

References Cited by the Examiner

UNITED STATES PATENTS 3,078,307  2/63  Craig et al. _____ 260—570.8

FOREIGN PATENTS 231,420  5/59  Australia.

OTHER REFERENCES

Adams et al.: "Organic Reaction," vol. 5, pages 302–303 (1949).

Adams et al.: "Organic Reactions," vol. 4, Chapter 3, pages 174–202 (1948).

Couturier: "Comptes Rendus," vol. 207, pages 345–347 (1938).

CHARLES B. PARKER, *Primary Examiner.*

L. ZITVER, *Examiner.*